(12) United States Patent
Sethuraman et al.

(10) Patent No.: US 8,066,421 B2
(45) Date of Patent: Nov. 29, 2011

(54) METHOD OF ADDING STMP TO A GYPSUM SLURRY

(75) Inventors: Gopalakrishnan Sethuraman, Charlotte, NC (US); Charles Dennis Price, Matthews, NC (US); John L. Phillips, Matthews, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 210 days.

(21) Appl. No.: 11/773,361

(22) Filed: Jul. 3, 2007

(65) Prior Publication Data

US 2009/0010093 A1   Jan. 8, 2009

(51) Int. Cl.
*B28C 5/00* (2006.01)

(52) U.S. Cl. .............. 366/4; 366/6; 366/65; 366/181.4

(58) Field of Classification Search ............. 366/3, 6, 366/40, 64, 65, 181.4
See application file for complete search history.

(56) References Cited

U.S. PATENT DOCUMENTS

| | | | | | |
|---|---|---|---|---|---|
| 1,733,741 | A | * | 10/1929 | Lovett | 366/3 |
| 2,097,088 | A | * | 10/1937 | Mills | 366/3 |
| 2,253,059 | A | * | 8/1941 | Camp | 366/65 |
| 2,639,901 | A | * | 5/1953 | Teale | 366/178.3 |
| 2,985,219 | A | * | 5/1961 | Summerfield | 156/39 |
| 3,006,615 | A | * | 10/1961 | Mason, Jr. | 366/20 |
| 3,262,799 | A | * | 7/1966 | Mccleary et al. | 106/783 |
| 3,343,818 | A | * | 9/1967 | Plemous et al. | 366/3 |
| 4,057,443 | A | * | 11/1977 | Stiling et al. | 156/43 |
| 4,224,078 | A | * | 9/1980 | Pilgrim | 106/783 |
| 4,252,568 | A | * | 2/1981 | Bounini | 106/781 |
| 4,518,652 | A | * | 5/1985 | Willoughby | 428/312.4 |
| 4,708,745 | A | * | 11/1987 | Schonhausen | 106/645 |
| 5,135,805 | A | | 8/1992 | Sellers et al. | |
| 5,643,510 | A | * | 7/1997 | Sucech | 264/40.1 |
| 5,683,635 | A | * | 11/1997 | Sucech et al. | 264/42 |
| 6,340,388 | B1 | * | 1/2002 | Luongo | 106/675 |
| 6,376,558 | B1 | * | 4/2002 | Bahner et al. | 516/11 |
| 6,402,359 | B2 | * | 6/2002 | Bahner et al. | 366/65 |
| 6,494,609 | B1 | * | 12/2002 | Wittbold et al. | 366/192 |
| 6,874,930 | B2 | * | 4/2005 | Wittbold et al. | 366/192 |
| 2001/0001218 | A1 | | 5/2001 | Luongo | |
| 2001/0015935 | A1 | * | 8/2001 | Bahner et al. | 366/65 |
| 2002/0017222 | A1 | * | 2/2002 | Luongo | 106/611 |
| 2002/0035180 | A1 | * | 3/2002 | Sethuraman et al. | 524/201 |
| 2004/0026002 | A1 | * | 2/2004 | Weldon et al. | 156/43 |
| 2004/0092676 | A1 | * | 5/2004 | Savoly et al. | 525/535 |

OTHER PUBLICATIONS

International Searching Authority, International Search Report, Mar. 6, 2008.
International Searching Authority, Written Opinion of the International Searching Authority, Mar. 6, 2008.

* cited by examiner

*Primary Examiner* — Tony G Soohoo
(74) *Attorney, Agent, or Firm* — Ice Miller LLP

(57) ABSTRACT

The disclosure relates to a method for effectively and efficiently adding sodium trimetaphosphate to a gypsum slurry. In one exemplary embodiment, the sodium trimetaphosphate is added at the same time as foam is added to the gypsum slurry through the foam waterline. In another exemplary embodiment, the sodium trimetaphosphate is added at the same time as additional water is added to the gypsum slurry through the gauging waterline. The sodium trimetaphosphate can be added to either or both waterlines in its dry form or in a diluted solution.

20 Claims, 1 Drawing Sheet

METHOD OF ADDING STMP TO A GYPSUM SLURRY

BACKGROUND

To be commercially profitable, gypsum products, such as wallboard, are typically manufactured by continuous high speed processes. Manufacturers mine and transport gypsum to a mill in order to dry it, crush/grind it and calcine it to yield stucco. The reaction for the calcinations process is characterized by the following equation:

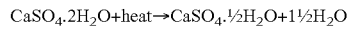

$$CaSO_4 \cdot 2H_2O + \text{heat} \rightarrow CaSO_4 \cdot \tfrac{1}{2}H_2O + 1\tfrac{1}{2}H_2O$$

This equation shows that calcium sulfate dihydrate plus heat yields calcium sulfate hemihydrate (stucco) plus water vapor. This process is conducted in a calciner, of which there are several types known in the art. The stucco can contain one of two forms of calcium sulfate hemihydrate: the α-hemihydrate form and the β-hemihydrate form. These two types of stucco are often produced by different means of calcination. While the β-hemihydrate form is normally used due to its lower cost, either type of calcium sulfate hemihydrate is suitable for use.

Calcined gypsum (stucco) has the valuable property of being chemically reactive with water, and will "set" rather quickly when the two are mixed together. This setting reaction reverses the above-described stucco chemical reaction performed during the calcination step. The reaction proceeds according to the following equation:

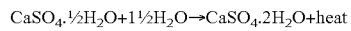

$$CaSO_4 \cdot \tfrac{1}{2}H_2O + 1\tfrac{1}{2}H_2O \rightarrow CaSO_4 \cdot 2H_2O + \text{heat}$$

In this reaction, the calcium sulfate hemihydrate is rehydrated to its dihydrate state over a fairly short period of time. The actual time required for this setting reaction generally depends upon the type of calciner employed and the type of gypsum rock that is used. The reaction time can be controlled to a certain extent by the use of additives such as accelerators and retarders.

While conventional gypsum products have many advantages, it has also long been desired to reduce the cost of manufacturing gypsum wallboard. One method of reducing the cost of wallboard has been to reduce the amount of water used in the manufacturing of the wallboard. Reduction in water reduces the amount of free water left in the wallboard after the setting reaction. A lower amount of free water left in the wallboard results in less drying energy being expended to remove the free water, which in turn saves energy costs associated with drying wallboard (i.e., the fuel cost associated with operating a kiln to dry the wallboard). However, the reduction of water negatively impacts the quality of the board produced (i.e., the strength paper-to-core bond and the compressive strength of the board may be decreased), because the reduction of water usually results in some of the calcium sulfate hemihydrate not being rehydrated to its dihydrate state. Wallboard gets its strength from the formation of crystals of calcium sulfate dihydrate during this rehydration process. The adverse effect on wallboard quality from reduced water levels prevents manufacturers from further cutting manufacturing costs by reducing the amount of water used in the slurry composition.

Moreover, lightweight wallboard is often produced by incorporating excess foam into calcined gypsum slurries, which in turn yield corresponding permanent voids in the product when the set gypsum is formed. Significant concentrations of foaming agents have to be employed to produce the desired concentration of voids in the set gypsum, in order to obtain a product of desired density because the aqueous foams employed are inherently unstable. The instability of the foaming agents leads to many of the bubbles coalescing and escaping the slurry before the set gypsum forms and thus, a significant amount of foaming agent must be used to get the desired lower density. The significant amounts of foaming agents used further increases material costs in the production of wallboard. Moreover, other materials must be used to increase the strength of lightweight wallboard, such as natural polymers (e.g., starch) which further increases the cost of manufacturing gypsum wallboard.

It is known in the art that sodium trimetaphosphate ("STMP") can be utilized in the wallboard manufacturing process to increase the quality of wallboard. While STMP has this effect, it should be noted that the use of STMP in any wallboard manufacturing process is dependent on many factors. For example, STMP is ineffective in high pH level environments (i.e., greater than 10). Some manufacturing plants have to create slurries with high pH levels due to the type of gypsum the plant is using and in those environments, STMP has no effect. In all other environments, STMP can be used to increase the core quality of wallboard and allow manufacturers to reduce the amount of natural polymer (i.e., starch) used to produce wallboard of suitable quality. STMP is a combination of earth metals and is known by the chemical equation $(NaPO_3)_3$. In its solid form it is a salt, but when dissolved in an aqueous solution, it is present as a trimetaphosphate ion. It is believed that the addition of STMP to the slurry promotes long crystal growth. Such crystals add the most strength to the core of the wallboard and also serve to form stronger bonds between the core and paper. While in theory, STMP can be used by manufacturers to decrease costs by increasing the core quality of wallboard, it has been discovered in practice that the current methods of adding STMP leads to further problems and delays.

In known manufacturing processes for gypsum wallboard, a slurry is formed by premixing dry and wet ingredients in a mixing apparatus, such as a pin mixer. The dry ingredients can include, but are not limited to, any combination of calcium sulfate hemihydrate (stucco), fiberglass, accelerator, and in some cases natural polymer (i.e., starch). The wet ingredients can be made of many components, including but not limited to, a mixture of water, paper pulp, potash, and in some cases natural polymer (hereinafter, collectively referred to as a "pulp solution"). The pulp solution provides a significant portion of the water that forms the gypsum slurry of the core composition of the wallboard. The dry ingredients and the pulp solution contain the basic chemical components of a piece of wallboard and conventional methods of preparing such wallboards are well known to those skilled in the art. For example, the dry ingredients and pulp solution can be mixed together in a pin mixer. In this manner, the dry ingredients and pulp solution create a fluid mixture or "slurry."

The slurry is discharged from the mixer through the mixer's outlet chute or "boot" which spreads the slurry on a moving, continuous bottom sheet of paper. A moving, continuous top sheet of paper is placed on the slurry and the bottom paper sheet, so that the slurry is positioned in between the top and bottom sheets of paper to form the board. The board can then pass through a forming station which forms the wallboard to the desired thickness and width. The board then travels along a belt line for several minutes, during which time the rehydration reaction occurs and the board stiffens. The boards are then cut into a desired length and then fed into a large, continuous kiln for drying. During drying, the excess water (free water) is evaporated from the gypsum core while the chemically bound water is retained in the newly formed gypsum crystals.

In such manufacturing processes, it is known to add desired quantities of STMP (in either its dry form or in solution) to the dry ingredients or to the wet ingredients. In practice, the STMP added in either of these manners initially dissolve in the pulp solution. However, during the mixing of the dry ingredients with the pulp solution to form the slurry, a portion of the STMP precipitates out as phosphates due to cationic contents in the pulp solution. As a result, the slurry is discharged with only a portion of the originally added STMP being a part of the slurry and an amount of precipitation being left behind in the pin mixer. Over time, the precipitation builds up in the mixer and ends up clogging the mixer. As a result, the manufacturing process needs to be shut down periodically to clean out the mixer. Such delays are costly and it is desired for them to be avoided. It is also desirable to come up with a way to reduce costs by reducing the amount of STMP needed for the manufacturing of gypsum products and to prevent precipitation from occurring.

The precipitation detrimentally affects the quality of the board that is produced because some of the precipitation left in the pin mixer can break down and be discharged through the outlet, which in turn causes paper break down and damage to the forming process which may decrease the gypsum setting time. Accordingly, it is desired to develop a method that allows the STMP to be more effectively and efficiently added to gypsum slurries in order to reduce the amount of STMP needed and to avoid the problems associated with the build up or deposits of phosphates being formed in the pin mixer.

BRIEF SUMMARY

This disclosure deals with more efficient and effective methods of adding STMP to gypsum slurries. In one exemplary embodiment, the method for adding STMP to the gypsum slurry involves using a mixer with a hopper connected to and leading into the mixer, a pulp waterline connected to and leading into the mixer and at least one other waterline connected to and leading into the mixer. Dry ingredients, such as calcium sulfate hemihydrate (stucco), fiberglass, accelerator, and in some cases natural polymer (i.e., starch), are then added to the mixer through the hopper and a pulp water solution is added to the mixer through the pulp waterline. The mixer is operated to mix the dry ingredients with the pulp water solution to form a gypsum slurry. While any suitable mixer can be used to create the gypsum slurry, it is currently preferred to use a pin mixer.

STMP can then be added to the gypsum slurry in the mixer through the other waterline. This other waterline can be a gauging waterline or a foam waterline or both. While the STMP can be added through both the gauging waterline and the foam waterline (if both are present), it is preferred that the STMP only be added through one of the foam or gauging waterline.

STMP can be added to the waterline either in its dry form or in a diluted solution. It is preferred that STMP be added in a diluted solution and that such diluted solution comprise about 8% to about 18% STMP. Due to limitations in the system of producing the gypsum slurry, it may be preferable to use a diluted solution comprising about 8% to about 10% STMP. Additionally, while any amount of STMP can be used to obtain the desired results, it is preferred that only about 0.1 to about 0.65 pounds of STMP per 1,000 square feet of the gypsum slurry be used.

DETAILED DESCRIPTION

Figure 1:
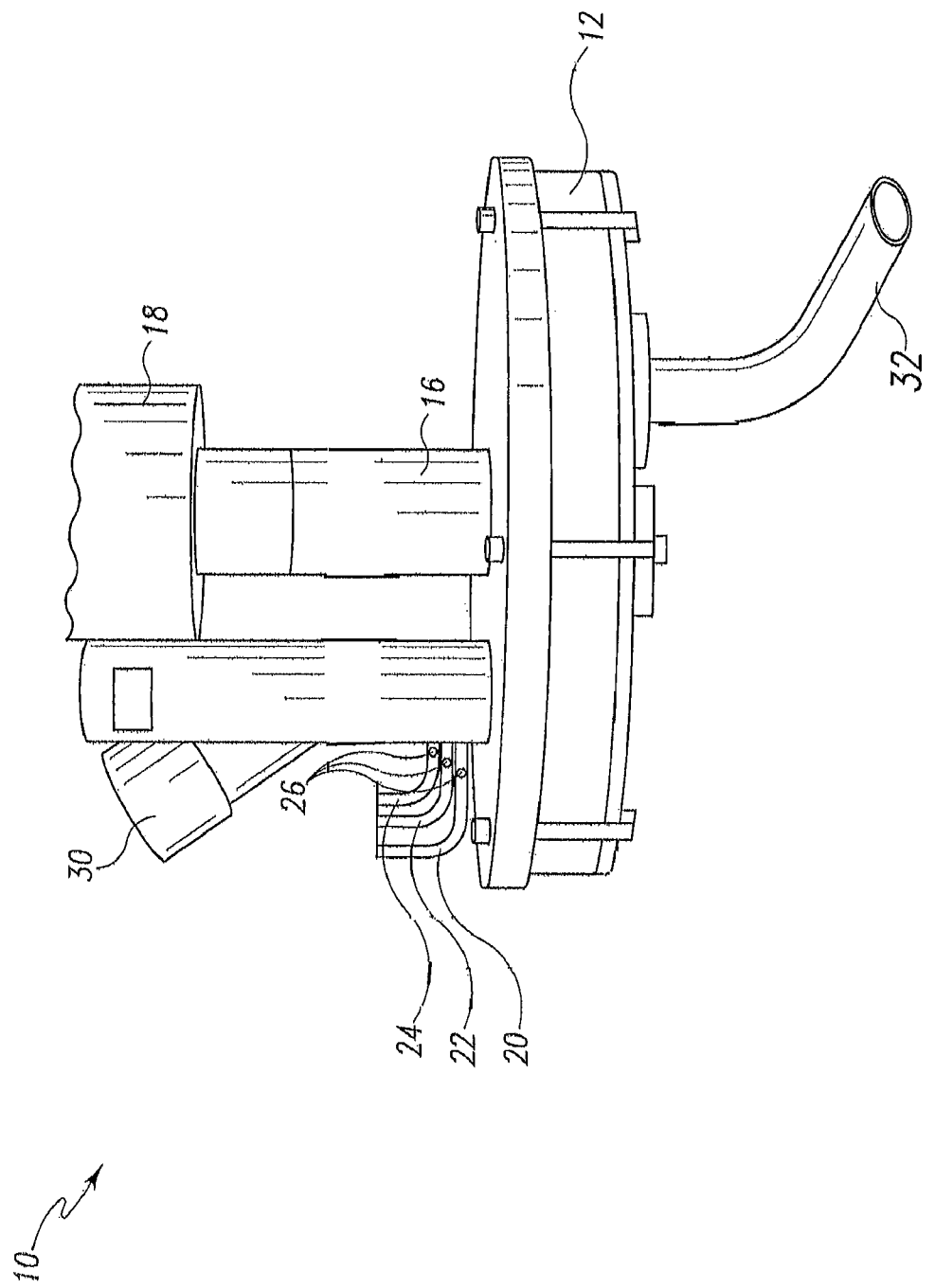
FIG. 1 is a front view of an exemplary pin mixer.

This disclosure deals with more efficient and effective methods of adding STMP to gypsum slurries. For example, as discussed, a method for manufacturing gypsum wallboard includes pre-mixing dry ingredients and a pulp solution, in a mixing apparatus, such as a pin mixer to create the gypsum slurry. The dry ingredients can include, but are not limited to, any combination of calcium sulfate hemihydrate (stucco), fiberglass, accelerator, and/or natural polymer (i.e., starch). The wet ingredients of the pulp solution can include many components, including but not limited to, a mixture of water, paper pulp, potash, and in some cases natural polymer (i.e., starch). Additionally, other ingredients can be added to the pin mixer to form the slurry, including but not limited to, foam, accelerators, and/or retarders.

FIG. 1 shows a front perspective view of an exemplary pin mixer 10 that can be used to mix the dry ingredients with the pulp solution to produce the stucco slurry. As shown in FIG. 1, pin mixer 10 has a shell 12 that houses a plurality of pins (not shown). A motor 18 operates to turn a rotor 16 which in turn spins the pins in shell 12 to mix the ingredients. Pin mixer 10 also has hopper 30 that allows for the dry ingredients to be deposited into pin mixer 10. Pulp waterline 20 for adding the pulp solution, gauging waterline 22 for adding additional water, and foam waterline 24 for adding foam are all connected to mixer 10 and allow for the pulp solution, water, and a foam solution to be added to the pin mixer and the gypsum slurry, respectively. Each of the waterlines 20, 22, and 24 have an inlet 26 that allow for other components to be added to the waterlines. The slurry is deposited on a bottom stream of cover paper (not shown) through slurry discharge 32, which can be a boot or other suitable conduit. While FIG. 1 show an exemplary pin mixer used in a gypsum product manufacturing process, it will be appreciated that any number of suitable mixers exist for forming the slurry and that FIG. 1 is only provided for the sake of discussion.

One exemplary embodiment of a method that increases the effectiveness and efficiency of introducing STMP into a gypsum slurry involves the step of introducing an amount of either dry STMP or a diluted solution of STMP into the gauging waterline. The gauging waterline allows for water to be added to the pin mixer. Referring to FIG. 1, STMP can be added to the water passing through the gauging waterline through an inlet 26 of gauging waterline 24, so that STMP will be added to the slurry as water is added to the slurry through gauging waterline 24. While any number of means of adding the STMP to the gauging waterline can be used, it normally involves the use of a pump to deliver a diluted solution of STMP directly to the gauging waterline 24 through an inlet.

Another embodiment of a method that increases the effectiveness and efficiency of introducing STMP into a gypsum slurry involves the step of introducing an amount of either dry STMP or a diluted solution of STMP into the foam waterline. The core density and the overall weight/density of the wallboard can be controlled and reduced by incorporating foam into the stucco slurry. The foam usually is prepared using foam water, a foaming agent (i.e., soap), and air in any number of mechanical foam generation devices. It will be appreciated by one skilled in the art that as the weight of water is reduced in the stucco slurry, the volume of aqueous foam added to the slurry is increased to maintain the board weight. The added foam creates aqueous bubbles in the slurry that yield corresponding permanent voids in the product when the set gypsum is formed. Referring to FIG. 1, foam is added to pin mixer 10 through foam waterline 22 and STMP can be added to the foam through inlet 26 of foam waterline 22, so that STMP will be added to the gypsum slurry as the foam is added to the gypsum slurry. While any number of means of adding the STMP to the foam waterline 22 can be used, it normally involves the use of a pump to deliver a diluted solution of STMP directly to the foam waterline 22 through inlet 26.

The above-described methods involve the step of adding a STMP in a dry form or a diluted solution of STMP to the gauging waterline or foam waterline. The solubility of commercially available STMP in solution typically ranges from about 13% to about 21%. It is preferred that the diluted solutions in these exemplary methods be a solution with about 8% to 18% STMP dissolved therein. Ultimately, the concentration of the diluted solution of STMP will be dependent on the mechanism for adding the STMP to the gauging waterline or foam waterline. For example, if a pump is used to add the STMP to the gauging waterline or foam waterline, the concentration of the diluted solution of the STMP will be dependent on the pump's throughput. In such cases, the pump may only allow for STMP to be added in diluted solutions with about 8% to 10% STMP dissolved therein.

The addition of the STMP into the foam waterline or gauging waterline leads to greater efficiency and effectiveness of adding STMP to a gypsum product manufacturing process. For example, it reduces the amount of STMP needed to produce gypsum wallboard. Only about 0.1 to about 0.65 pounds of STMP per 1,000 square feet of gypsum slurry needs to be used to have beneficial effects on the quality of the board. In contrast, other methods for adding STMP require that about 1.5 to 2 pounds per 1,000 square feet of gypsum slurry be used to have a comparable effect on the quality of the board. The reduced amount of STMP not only reduce materials costs but also has the added benefit of preventing deposits/build up in the pin mixer of calcium sulfate and thus, prevents delays caused by removing these deposits/build up. Moreover, adding STMP to the foam waterline also has the added benefit of acting as a water softener and, thus, allows for an increased amount of foam to be produced for plants using hard water resulting in less foaming agent being used. The reduction of the amount of foaming agent used reduces the overall cost of manufacturing wallboard.

The addition of STMP in this manner also has the benefit of reducing the amount of natural polymer used to create gypsum wallboard. Natural polymers, such as starch, are added to the slurry in order to increase the strength of the paper to core bond and to increase the strength of the board. Such natural polymers are an expensive component and the reduction of the amount of natural polymer needed can substantially reduce the cost involved in manufacturing gypsum wallboard. The addition of STMP to the gauging waterline or the foam waterline increases the efficiency and effectiveness of adding STMP to the gypsum slurry which allows for an increase in quality of the produced wallboard. This increase in quality allows for manufacturers to reduce the amount of natural polymers added to the slurry without detrimentally effecting the overall quality of the wallboard. This reduction in natural polymers also reduces the cost of producing wallboard.

The following examples are included to demonstrate some of the possible embodiments of the invention. It should be appreciated by those of ordinary skill in the art that the techniques disclosed in the examples which follow represent techniques discovered by the inventor to function well in the practice of the invention, and thus, can be considered to constitute preferred modes for its practice. However, those of ordinary skill in the art should, in light of the present disclosure, appreciate that many changes can be made in the specific embodiments which are disclosed and still obtain a like or similar result without departing from the spirit and scope of the invention.

Table I shows an exemplary component formulation in pounds per 1,000 square fee for ½ inch thick wallboard. It is understood by one skilled in the art that enough of each component is added to produce dry boards with weights around 1400 and 1650 pounds per 1,000 square feet for a ½ inch thick wallboard ("msf"). It will be appreciated by one skilled in the art that while these examples are for a ½ inch thick board, the exemplary methods can be used to produce wallboard of any thickness.

TABLE I

| Slurry Formulation | |
|---|---|
| Materials | lbs/msf |
| Stucco | 1620 |
| Foam Water | 275 |
| Gauging Water | 930 |
| Pulp (water and paper) | 185 |
| Soap | 0.6 |
| Water dispersant | 3.5 |
| Starch** | 9 |
| Accelerator | 9 |
| STMP | 0.1-0.65 |
| Sugar | 2.31 |
| Potash | 2.06 |
| Retarder | 0.1 |
| Starch Wet | 6.17 |

**Without STMP the starch is added in the amount of 12 lbs/msf

In addition to the stucco, starch, pulp paper, pulp water and potash being added to the stucco slurry composition, the slurry composition contains an accelerator, such as BMA (produced by National Gypsum Company), a retarder, such as, Proteinaceious Retarder (produced by the National Gypsum Company), Accumer (produced by Rohm & Haas), and RA-77 (produced by Rhodia), and a dispersant, such as Diloflow (produced by Geo Chemicals), Gypflow (produced by Ande) and Daxad (produced by Dow/Hampshire).

As shown in Table II, a series of samples were prepared using the above formulation with varying amounts of STMP added to the manufacturing process through the gauging waterline. The samples made were compared to determine the optimal range of STMP to use to increase the quality of the wallboard. The sample series only differed in the amount of STMP used. Using tests known to those skilled in the art, the samples were tested for humidified defection and a few of the samples were also tested for width shrinkage. Each line of Table II represents an average of five samples tested. The last line is the control sample where no STMP was used and "msf" refers to the unit of 1,000 square feet.

TABLE II

| STMP Variations | | |
|---|---|---|
| STMP (lbs/msf) | Humidified Deflection | Width Shrinkage (in) |
| 0.25 | 0.14 | N/A |
| 0.25 | 0.14 | N/A |
| 0.35 | 0.085 | 0.031 |
| 0.35 | 0.085 | N/A |
| 0.45 | 0.11 | 0.063 |
| 0.45 | 0.082 | N/A |
| 0.55 | 0.094 | 0.016 |
| 0.55 | 0.109 | N/A |
| 0.65 | 0.094 | 0.016 |

TABLE II-continued

STMP Variations

| STMP (lbs/msf) | Humidified Deflection | Width Shrinkage (in) |
|---|---|---|
| 0.65 | 0.109 | N/A |
| 0 | 0.205 | 0.094 |

As shown in Table III, a series of samples were prepared using the above slurry formulation with reduced amounts of starch. The samples also have varying amount of STMP added to the manufacturing process through the gauging waterline. Using tests known to those skilled in the art, the samples were tested for humidified defection and a few of the samples were also tested for width shrinkage. The tests revealed that starch could be reduced with negligible effects on the board strength. Each line of Table III represents an average of five samples tested. The last line is the control sample where no STMP was used and no reduction in starch occurred.

TABLE III

STMP Variations and Starch Reduction

| Reduction in Starch (lbs/msf) | STMP (lbs/msf) | Humidified Deflection | Width Shrinkage (in) |
|---|---|---|---|
| −3 | 0.45 | 0.102 | 0.016 |
| −3 | 0.45 | 0.121 | N/A |
| −3 | 0.55 | 0.099 | 0.031 |
| −3 | 0.55 | 0.094 | N/A |
| −3 | 0 | 0.065 | 0.094 |
| −3 | 0 | 0.060 | N/A |
| 0 | 0 | 0.282 | 0.094 |

As shown in Tables II and III, boards with STMP exhibits a reduced amount of width shrinkage during the drying of the board. This is significant because lower width shrinkage allows for manufactures to use less amount of the slurry in creating the board. In other words, manufacturers have to account for the width shrinkage by using a greater amount of slurry. The reduction in width shrinkage leads to additional material and cost savings in the manufacturing process. The use of STMP also allows for a board that exhibits improved humidified deflection which leads to an increase in quality of the board.

While the present disclosure describes in detail different methods of adding STMP to a gypsum slurry with reference to certain exemplary embodiments thereof, such are offered by way of non-limiting example of the invention, as other versions are possible. For example, the described exemplary embodiments deal with methods for adding STMP to a gypsum slurry used to produce gypsum wallboard, but it will be appreciated by one skilled in the art that the described methods could also be used to add STMP to any type of gypsum slurry. It is anticipated that a variety of other modifications and changes will be apparent to those having ordinary skill in the art and that such modifications and changes are intended to be encompassed within the spirit and scope of the invention as defined by the following claims.

We claim:

1. A method for adding sodium trimetaphosphate to a gypsum slurry, the method comprising the steps of:
    providing a mixer with a hopper connected to the mixer, a pulp waterline feeding into the mixer and at least one other waterline feeding into the mixer wherein the other waterline is apart from the pulp waterline;
    adding stucco and at least one other dry ingredient to the mixer through the hopper;
    adding water and at least one other wet ingredient to the mixer through the pulp waterline;
    forming a gypsum slurry by mixing stucco, the at least one other dry ingredient with water and the at least one other wet ingredient in the mixer; and
    adding sodium trimetaphosphate to the at least one other waterline so that the sodium trimetaphosphate is fed into the mixer and added to the gypsum slurry.

2. The method of claim 1, wherein the step of adding sodium trimetaphosphate comprises adding a diluted solution of sodium trimetaphosphate to the gypsum slurry.

3. The method of claim 2, wherein the diluted solution of sodium trimetaphosphate comprises a solution made up of about 8% to about 18% sodium trimetaphosphate.

4. The method of claim 2, wherein the diluted solution of sodium trimetaphosphate comprises a solution made up of about 8% to about 10% sodium trimetaphosphate.

5. The method of claim 1, wherein the at least one other waterline comprises a gauging waterline.

6. The method of claim 1, wherein the at least one other waterline comprises a foam waterline.

7. The method of claim 1, wherein the at least one other waterline comprises a gauging waterline and a foam waterline and the step of adding the sodium trimetaphosphate comprises adding sodium trimetaphosphate to the gypsum slurry either through the gauging waterline or the foam waterline.

8. The method of claim 1, wherein the step of adding sodium trimetaphosphate to the gypsum slurry comprises adding sodium trimetaphosphate in the amount of about 0.1 to about 0.65 pounds of STMP per 1,000 square feet of the gypsum slurry.

9. The method of claim 1, wherein the mixer is a pin mixer.

10. A method for adding sodium trimetaphosphate to a gypsum slurry, the method comprising the steps of:
    providing a mixer with a hopper connected to the mixer, a pulp waterline feeding into the mixer and at least one other waterline feeding into the mixer wherein the other waterline is apart from the pulp waterline;
    adding stucco and at least one other dry ingredient to the mixer through the hopper;
    adding water and at least one other wet ingredient to the mixer through the pulp waterline;
    forming a gypsum slurry by mixing stucco, the at least one other dry ingredient with water and the at least one other wet ingredient in the mixer; and
    adding a diluted solution made up of about 8% to about 18% sodium trimetaphosphate to the at least one other waterline so that the sodium trimetaphosphate is fed into the mixer and added to the gypsum slurry.

11. The method of claim 10, wherein the diluted solution of sodium trimetaphosphate comprises a solution made up of about 8% to about 10% sodium trimetaphosphate.

12. The method of claim 10, wherein the at least one other waterline comprises a gauging waterline.

13. The method of claim 10, wherein the at least one other waterline comprises a foam waterline.

14. The method of claim 10, wherein the at least one other waterline comprises a gauging waterline and a foam waterline and the step of adding the sodium trimetaphosphate comprises adding sodium trimetaphosphate to the gypsum slurry either through the gauging waterline or the foam waterline.

15. The method of claim 10, wherein the step of adding the diluted solution of sodium trimetaphosphate to the gypsum slurry comprises adding about 0.1 to about 0.65 pounds of STMP per 1,000 square feet of the gypsum slurry.

16. The method of claim 10, wherein the mixer is a pin mixer.

17. A method for adding sodium trimetaphosphate to a gypsum slurry, the method comprising the steps of:

providing a mixer with a hopper connected to the mixer, a pulp waterline feeding into the mixer, a foam waterline feeding into the mixer, and a gauging waterline feeding into the mixer;

adding stucco and at least one other dry ingredient to the mixer through the hopper;

adding a pulp solution to the mixer through the pulp waterline;

forming a gypsum slurry by mixing the dry ingredients with the pulp solution in the mixer; and adding a diluted solution made up of about 8% to about 18% sodium trimetaphosphate to the foam or the gauging waterline so that the sodium trimetaphosphate is fed into the mixer and added to the gypsum slurry.

18. The method of claim 17, wherein the diluted solution of sodium trimetaphosphate comprises a solution made up of about 8% to about 10% sodium trimetaphosphate.

19. The method of claim 17, wherein the step of adding the diluted solution of sodium trimetaphosphate to the gypsum slurry comprises adding about 0.1 to about 0.65 pounds of pounds of STMP per 1,000 square feet of the gypsum slurry.

20. The method of claim 17, wherein the mixer is a pin mixer.

\* \* \* \* \*